United States Patent
Singh et al.

(10) Patent No.: US 7,471,682 B2
(45) Date of Patent: Dec. 30, 2008

(54) METHOD AND APPARATUS FOR PROVIDING INTERNAL TABLE EXTENSIBILITY BASED ON PRODUCT CONFIGURATION

(75) Inventors: Gaurav Singh, Santa Clara, CA (US); Ali Kani, Mountain View, CA (US); Kiran Kattel, Sunnyvale, CA (US); Sridhar Subramanian, Sunnyvale, CA (US); Brian Hang Wai Yang, Monterey Park, CA (US)

(73) Assignee: RMI Corporation, Cupertino, CA (US)

( * ) Notice: Subject to any disclaimer, the term of this patent is extended or adjusted under 35 U.S.C. 154(b) by 838 days.

(21) Appl. No.: 10/687,789

(22) Filed: Oct. 17, 2003

(65) Prior Publication Data
US 2005/0083945 A1 Apr. 21, 2005

(51) Int. Cl.
*H04L 12/56* (2006.01)
(52) U.S. Cl. ............................ 370/392; 370/401
(58) Field of Classification Search ............ 370/395.31
See application file for complete search history.

(56) References Cited

U.S. PATENT DOCUMENTS

| | | | | |
|---|---|---|---|---|
| 6,574,240 | B1 * | 6/2003 | Tzeng | 370/469 |
| 6,907,469 | B1 * | 6/2005 | Gallo et al. | 709/238 |
| 7,015,921 | B1 * | 3/2006 | Trivedi et al. | 345/557 |
| 2003/0070039 | A1 * | 4/2003 | Gillingham | 711/108 |
| 2003/0152075 | A1 * | 8/2003 | Hawthorne et al. | 370/389 |

* cited by examiner

*Primary Examiner*—Chau Nguyen
*Assistant Examiner*—Louis Bell
(74) *Attorney, Agent, or Firm*—Zilka-Kotab, PC

(57) ABSTRACT

A configurable lookup table system including a first controller coupled to a first lookup table and a second controller coupled to a second lookup table is disclosed. The first controller configures the first lookup table for a first type lookup, which can be a Layer 2 or Media Access Control (MAC) type. The second controller configures the second lookup table based on a mode determination. If in a first mode, the second lookup table can be configured for a second type lookup, which can be a Layer 3 or Internet Protocol (IP) type. If in a second mode, the second lookup table can be configured for the first type lookup. This approach provides an efficient scheme for controlling and using multiple internal lookup tables for a variety of product configurations.

22 Claims, 3 Drawing Sheets

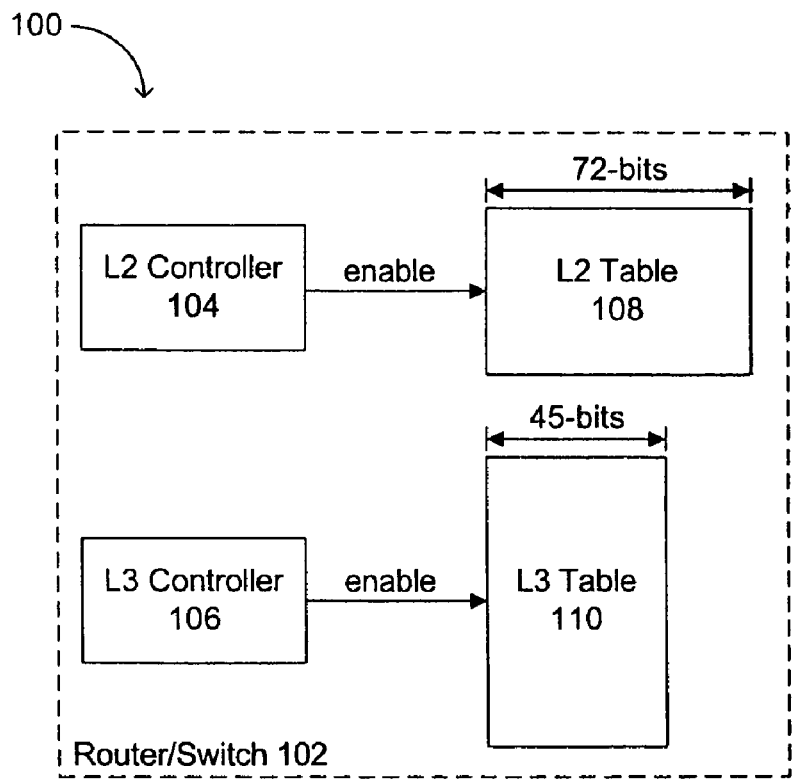
FIG. 1A (conventional)
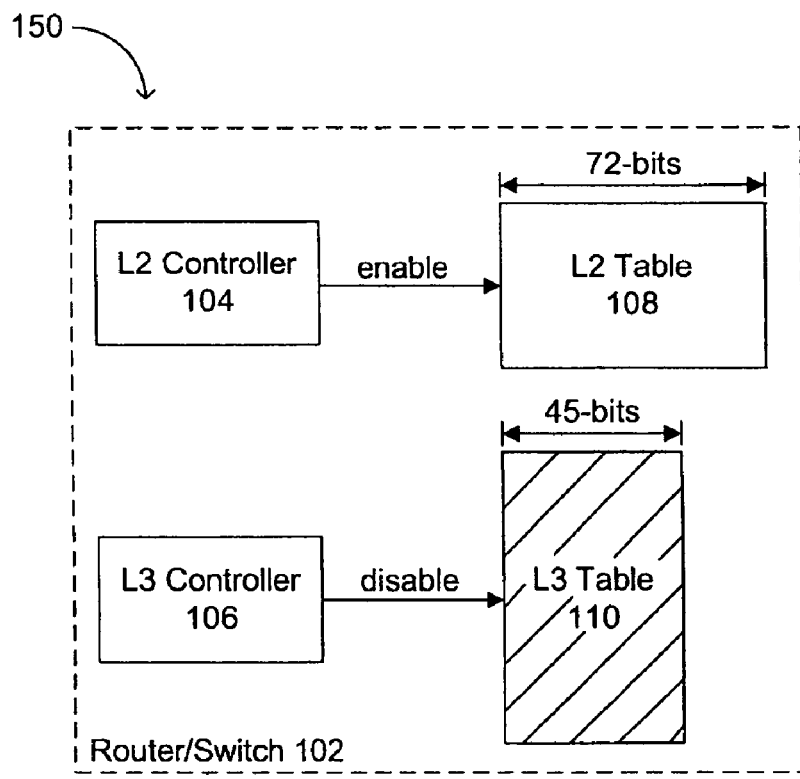
FIG. 1B (conventional)

METHOD AND APPARATUS FOR PROVIDING INTERNAL TABLE EXTENSIBILITY BASED ON PRODUCT CONFIGURATION

FIELD

The invention relates generally to the field of networking, and more particularly to lookup table configuration control.

BACKGROUND

In networking systems, routers and/or switches typically use lookup tables to facilitate or increase the speed of the forwarding of packets of information. Such tables can be implemented in hardware, for example, as content-addressable memory (CAM), which can include static random access memory (SRAM) type memory cells. Among the types of forwarding that can be accommodated in typical systems are Layer 2 (L2) and/or Layer 3 (L3) forwarding. L2 tables can include Media Access Control (MAC) address lookup and L3 tables can include Internet Protocol (IP) address lookup. Other example table types include IP MultiCast (MC), IP Next Hop Table (NHT), and IP Longest Prefix Match (LPM) tables. Internal (i.e., on-chip) tables can be used for the L2/L3 forwarding and these tables can, in many cases, be modified by hardware and/or software control.

For systems that support more than one type of lookup, a typical approach for table management is shown in FIG. 1A. FIG. 1A is a block diagram of a conventional L2/L3 lookup table arrangement used for both L2 and L3 type lookups. General reference character 100 indicates Router/Switch 102 includes L2 Controller 104 for control of L2 Table 108 as well as L3 Controller 106 for control of L3 Table 110. L2 Table 108 has an entry width of 72-bits and L3 Table 110 has an entry width of 45-bits. In this conventional approach, one table is always configured as L2 type and the other is always configured as L3 type.

Referring now to FIG. 1B, a block diagram of a conventional L2/L3 lookup table arrangement used for only L2 type lookups is shown and indicated by the general reference character 150. Like numbers are typically used herein to indicate the same or similar components as in the diagram of FIG. 1A. In FIG. 1B, L3 Controller 106 has switched control from "enable" to "disable" so that L3 Table 110 is not used for L2 type lookups. Thus, the table designated for L3 lookups goes unused, as indicated by the cross-hatching in FIG. 1B, in this conventional approach. This can represent a large portion of the die area that is not utilized. Accordingly, this approach is not cost effective.

Consequently, what is needed is a solution that can control and allocate internal lookup tables so that each table is substantially utilized for a variety of different product configurations.

SUMMARY

The invention overcomes the identified limitations and provides a solution that can control and allocate internal lookup tables so that each table is substantially utilized for a variety of different product configurations.

According to embodiments, a configurable lookup table system includes a first controller coupled to a first lookup table and a second controller coupled to a second lookup table. The first controller configures the first lookup table for a first type lookup, which can be a Layer 2 or Media Access Control (MAC) type. The second controller configures the second lookup table based on a mode determination. If in a first mode, the second lookup table can be configured for a second type lookup, which can be a Layer 3 or Internet Protocol (IP) type. If in a second mode, the second lookup table can be configured for the first type lookup.

According to another aspect of the embodiments, a method of controlling a lookup table system includes determining a first mode or a second mode. If a first mode, the method includes using a first lookup table for a first type lookup and using a second lookup table for a second type lookup. If a second mode, the method includes splitting the first type lookup into a first level and a second level, using the second lookup table for the first level, and using the first lookup table for the second level.

This approach provides an efficient scheme for controlling and using multiple internal lookup tables for a variety of product configurations.

BRIEF DESCRIPTION OF THE FIGURES

Embodiments of the invention are described with reference to the FIGS, in which:

FIG. 1A is a block diagram of a conventional L2/L3 lookup table arrangement used for both L2 and L3 type lookups.

FIG. 1B is a block diagram of a conventional L2/L3 lookup table arrangement used for only L2 type lookups.

DETAILED DESCRIPTION

Embodiments of the invention are described with reference to specific diagrams depicting system arrangements and methods. Those skilled in the art will recognize that the description is for illustration and to provide the best mode of practicing the invention. The description is not meant to be limiting. For example, reference is made to several types of forwarding lookup tables, including IP and MAC types, but the invention is applicable to other types of lookup tables as well. Further, table organization, including separate tables and the like, merely provide example implementations and should not be construed as limiting.

A router/switch chip according to embodiments can work in different modes. In one of the modes, the chip can perform both Layer 2 (L2) and Layer 3 (L3) type forwarding. This utilizes both the L2 and L3 tables included on the die. In another mode, the chip can re-configure so as to perform only L2 type forwarding. In this mode, L3 type tables are not needed. Rather than not use these tables in such a mode, as is commonly done in conventional approaches, a mechanism described herein can logically increase the size of the L2 type table by utilizing the L3 table. Accoding to embodiments, L3 tables can be designed in a format that encompasses both L2 and L3 type entries. Further, a unified memory controller can be employed for both modes.

Figure 2A:
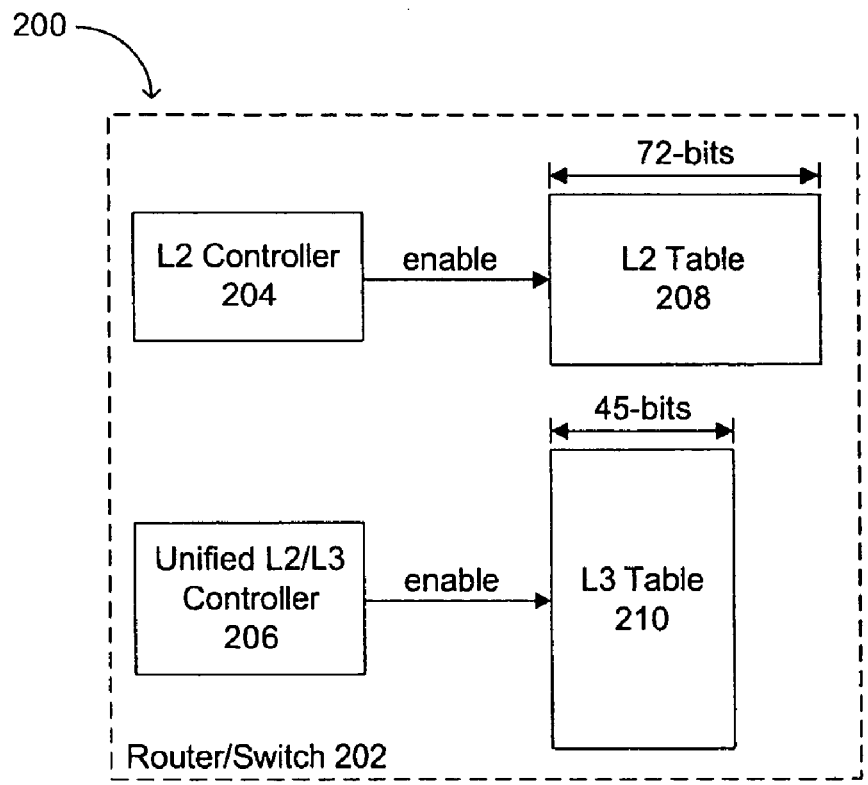
FIG. 2A is a block diagram of an L2/L3 lookup table arrangement in a first mode according to an embodiment.

Referring now to FIG. 2A, a block diagram of an L2/L3 lookup table arrangement in a first mode according to an embodiment is shown and indicated by the general reference character 200. Router/Switch 202 can include L2 Controller 204 for control of L2 Table 208 and Unified L2/L3 Controller 206 for control of L3 Table 210. In this one very particular example arrangement in an operational mode accommodating both L2 and L3 type lookups, a table entry width for L2

Table 208 may be 72-bits and a table entry width for L3 Table 210 may be 45-bits. TABLE 1 and TABLE 2 below show example bit designations for entries according to such example lookup types.

TABLE 1

(L2 Table Entry):

| Field: | Width (bits): | Description: |
|---|---|---|
| MAC Address | A | MAC destination address of the next hop |
| VLAN | B | VLAN ID to be used |
| Port Number | C | Exit port number (may be consistent with L2 table encoding) |
| Parity | D | Entry parity check bits |
| Total | 72 | |

TABLE 2

(L3 Table Entry):

| Field: | Width (bits): | Description: |
|---|---|---|
| Valid | E | Entry valid indication |
| Compare Key | F | Address key used for compare |
| Parity | G | Entry parity check bit |
| Total | 45 | |

Figure 2B:
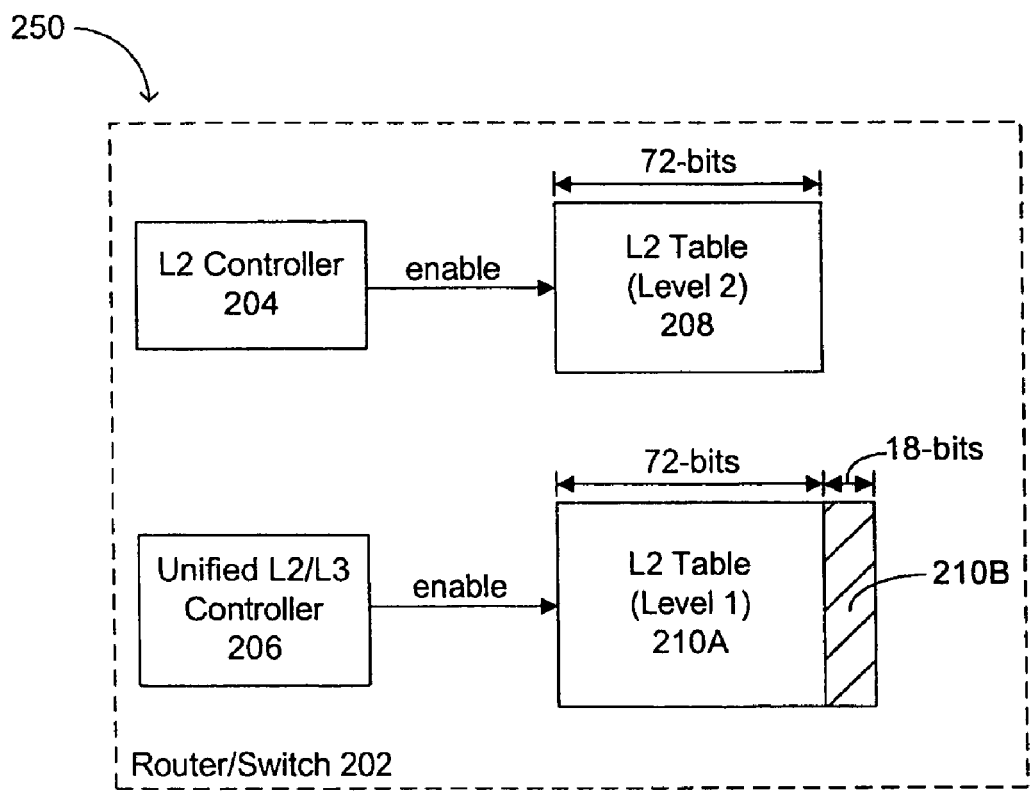
FIG. 2B is a block diagram of an L2/L3 lookup table arrangement in a second mode according to an embodiment.

Referring now to FIG. 2B, a block diagram of an L2/L3 lookup table arrangement in a second mode according to an embodiment is shown and indicated by the general reference character 250. Like numbers are typically used herein to indicate the same or similar components as in the diagram of FIG. 2A. According to embodiments, in this second operational mode, Unified L2/L3 Controller 206 can configure the L3 type table to function as an L2 type table. This can be done by configuring the table into two effective portions as shown: a first portion 210A and a second portion 210B. The first portion 210A can include usable L2 type entry allocation and the second portion 210B can be a reserved or unused portion, depending on the application. In this fashion, sets of two 45-bit wide entries can be effectively or logically combined to form an entry width of up to 90-bits, as one example. Accordingly, the general format of an L3 type table portion can be made to accommodate both L2 and L3 type lookups. Further, in this second mode, a hash table approach can be used for a "split" lookup where the 210A portion can form a "Level 1" and L2 Table 208 can form a "Level 2" indexed by the hash table. In this approach, a reference of perhaps a few bits can be done and then indexed into one or both of the example tables. Because of the possibility of finding a match or "hit" in each table, corresponding to two different addresses mapping to the same MAC address, there should be a checking mechanism and a compare performed to settle on the correct result.

TABLE 3 below shows example bit designations for entries in an L3 type table reconfigured to support L2 type lookups, according to embodiments.

TABLE 3

| Field: | Width (bits): | Description: |
|---|---|---|
| MAC Address | H | MAC destination address of the next hop |
| VLAN | I | VLAN ID to be used |
| Port Number | J | Exit port number (may be consistent with L2 table encoding) |
| Parity | K | Entry parity check bits |
| Reserved | L | |
| Total | 90 | |

Figure 3:
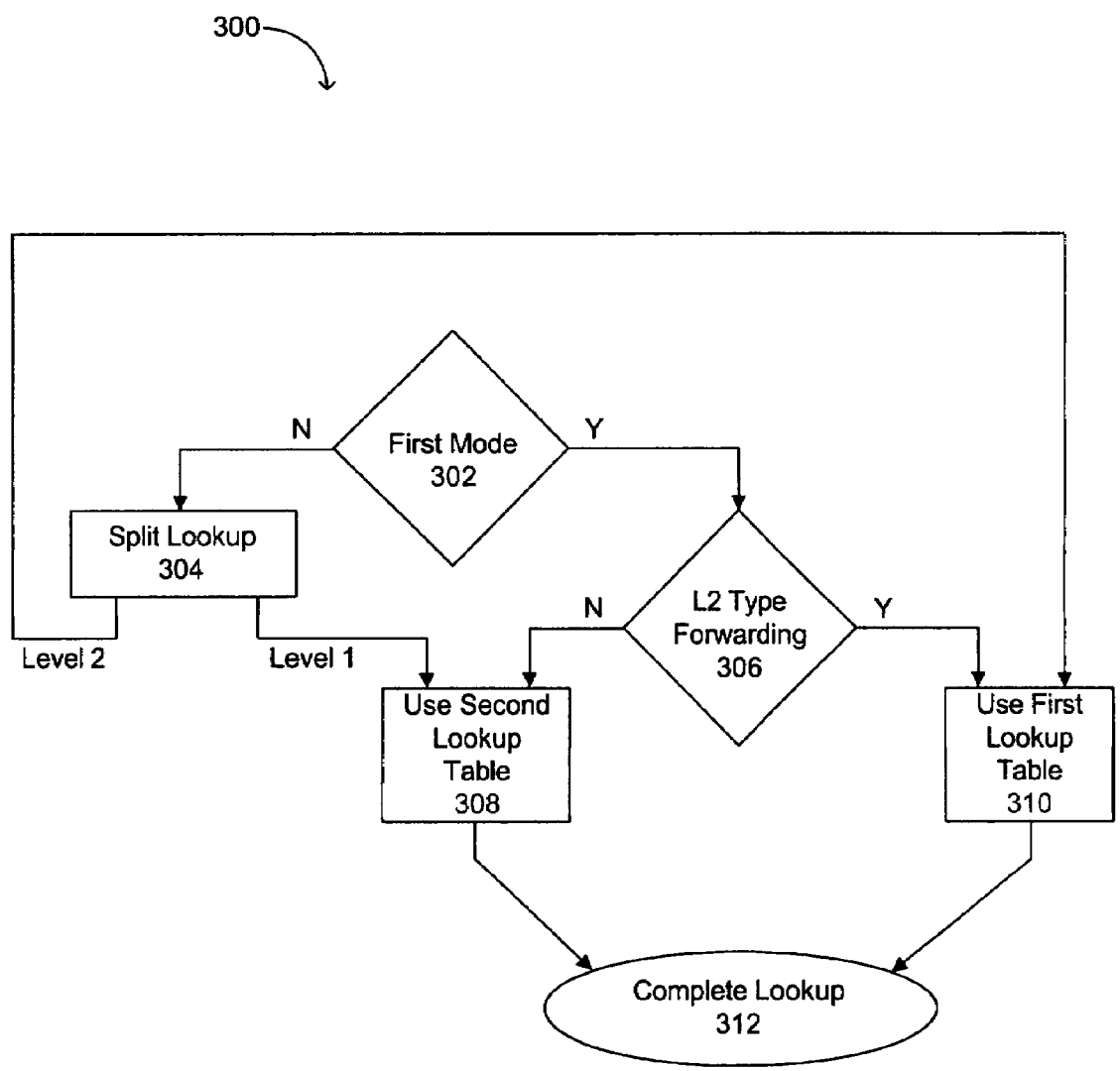
FIG. 3 is a flow diagram of a method of processing lookups according to an embodiment.

Referring now to FIG. 3, a flow diagram of a method of processing lookups according to an embodiment is shown and indicated by the general reference character 300. First Mode decision step 302 can determine whether the product is configured for both L2 and L3 type lookups (first mode) or only L2 type lookups (second mode), for example. If in the first mode, the lookup tables used depends on the designated lookup type, as determined in L2 Type Forwarding 306 decision box. If it is an L2 type lookup, the flow proceeds to Use First Lookup Table 310 and then to Complete Lookup 312. If it is an L3 type lookup, the flow proceeds to Use Second Lookup Table 308 and then to Complete Lookup 312. If in the second mode, the flow enters Split Lookup 304 function block. Two paths can exit this box: a "Level 1" path to Use Second Lookup Table 308 and a "Level 2" path to Use First Lookup Table 310. Alternatively, the "Level 1" and "Level 2" search functions can be done in a serial fashion, as opposed to the parallel functionality shown in FIG. 3. For example, a Level 1 lookup may be performed and, if a miss indication, a Level 2 lookup may then be performed. If a hit indication was obtained in the Level 1 lookup, then the serial flow may not proceed to a Level 2 lookup. Whether a serial or a parallel Level 1 and Level 2 arrangement is used may depend on system design considerations. In either arrangement, using the methods according to embodiments, a product configured for both L2 and L3 lookup types or only for L2 lookup types can efficiently utilize available internal lookup tables.

Advantages of embodiments of the invention include the control of lookup tables to substantially utilize the implemented internal tables based on a variety of possible product configurations.

Having disclosed exemplary embodiments and the best mode, modifications and variations may be made to the disclosed embodiments while remaining within the subject and spirit of the invention as defined by the following claims.

The invention claimed is:

1. A configurable lookup table system, comprising:
   a first controller coupled to a first lookup table, wherein the first controller configures the first lookup table for a first type lookup; and
   a second controller coupled to a second lookup table, wherein:
      in a first mode, the second controller configures the second lookup table for a second type lookup; and
      in a second mode, the second controller configures the second lookup table for the first type lookup, and splits the first type lookup into a first level and a second level for using the second lookup table for the first level and using the first lookup table for the second level.

2. The configurable lookup table system of claim 1, wherein:
   the first type lookup includes a Layer 2 lookup.

3. The configurable lookup table system of claim 2, wherein:
   the Layer 2 lookup includes a Media Access Control (MAC) address lookup.

4. The configurable lookup table system of claim 1, wherein:
   the second type lookup includes a Layer 3 lookup.

5. The configurable lookup table system of claim 4, wherein:
   the Layer 3 lookup includes an Internet Protocol (IP) address lookup.

6. The configurable lookup table system of claim 1, wherein:
   a lookup in the second mode includes:
      the first level in the second lookup table; and
      the second level in the first lookup table.

7. The configurable lookup table system of claim 6, wherein:
the second level in the first lookup table is configured:
to be performed if a miss indication from the first level in the second lookup table; and
to not be performed if a hit indication from the first level in the second lookup table.

8. The configurable lookup table system of claim 6, wherein:
the second lookup table includes a usable entry width of at least 72-bits.

9. A method of controlling a lookup table system, comprising:
determining a first mode or a second mode; and
when in the first mode:
using a first lookup table for a first type lookup; and
using a second lookup table for a second type lookup;
when in the second mode:
splitting the first type lookup into a first level and a second level;
using the second lookup table for the first level; and
using the first lookup table for the second level.

10. The method of controlling the lookup table system of claim 9, wherein:
the first type lookup includes a Layer 2 lookup.

11. The method of controlling the lookup table system of claim 10, wherein:
the Layer 2 lookup includes a Media Access Control (MAC) address lookup.

12. The method of controlling the lookup table system of claim 9, wherein:
the second type lookup includes a Layer 3 lookup.

13. The method of controlling the lookup table system of claim 12, wherein:
the Layer 3 lookup includes an Internet Protocol (IP) address lookup.

14. The method of controlling the lookup table system of claim 9, wherein:
the second lookup table includes a usable entry width of at least 72-bits.

15. The method of controlling the lookup table system of claim 9, wherein:
the splitting the first type lookup into the first level and the second level includes configuring for a parallel operation.

16. The method of controlling the lookup table system of claim 9, wherein:
the splitting the first type lookup into the first level and the second level includes configuring for a serial operation.

17. The method of controlling the lookup table system of claim 16, wherein:
the using the first lookup table for the second level is dependent on a miss indication from the using the second lookup table for the first level.

18. A means for controlling a lookup table, comprising:
a means for determining a first mode or a second mode; and
when in the first mode:
a means for using a first lookup table for a first type lookup; and
a means for using a second lookup table for a second type lookup;
when in the second mode:
a means for splitting the first type lookup into a first level and a second level;
a means for using the second lookup table for the first level; and
a means for using the first lookup table for the second level.

19. The means for controlling the lookup table of claim 18, wherein:
the means for splitting the first type lookup into the first level and the second level includes means for configuring for a parallel operation.

20. The means for controlling the lookup table of claim 18, wherein:
the means for splitting the first type lookup into the first level and the second level includes means for configuring for a serial operation.

21. The configurable lookup table system of claim 1, wherein, in the second mode, a hash table is used for a split lookup.

22. The configurable lookup table system of claim 21, wherein the second level is indexed by the hash table.

* * * * *